July 8, 1930.  M. M. TITTERINGTON  1,770,328
WINDMILL
Filed Dec. 24, 1926    2 Sheets-Sheet 1
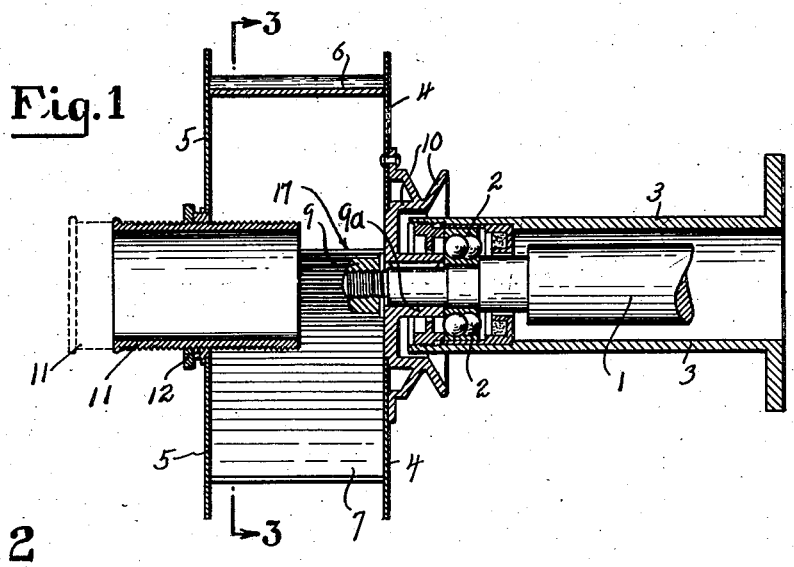
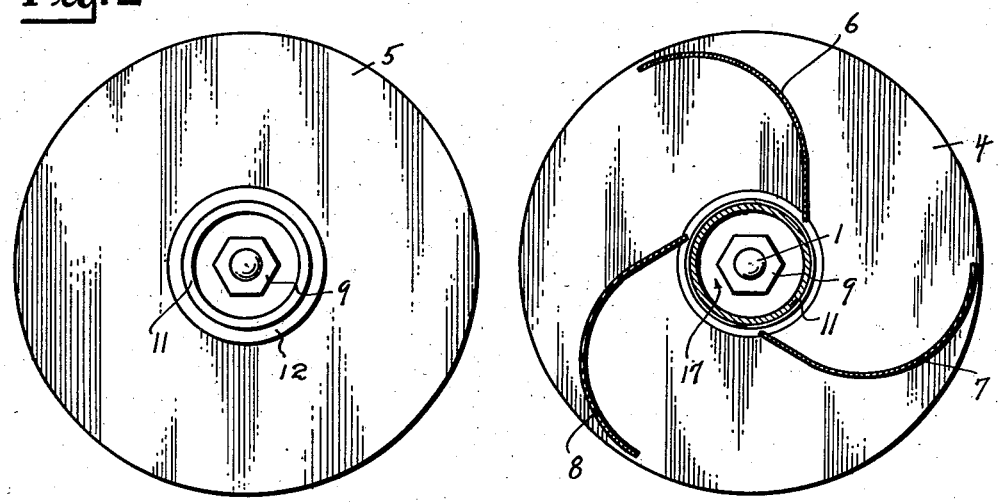
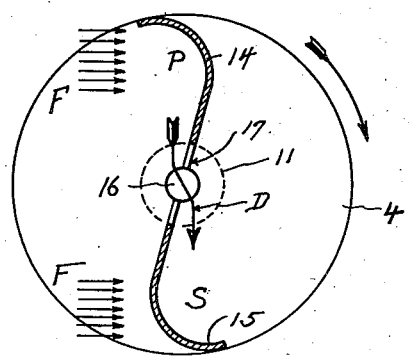
INVENTOR
MORRIS M. TITTERINGTON
BY
ATTORNEYS July 8, 1930.  M. M. TITTERINGTON  1,770,328
WINDMILL
Filed Dec. 24, 1926   2 Sheets-Sheet 2
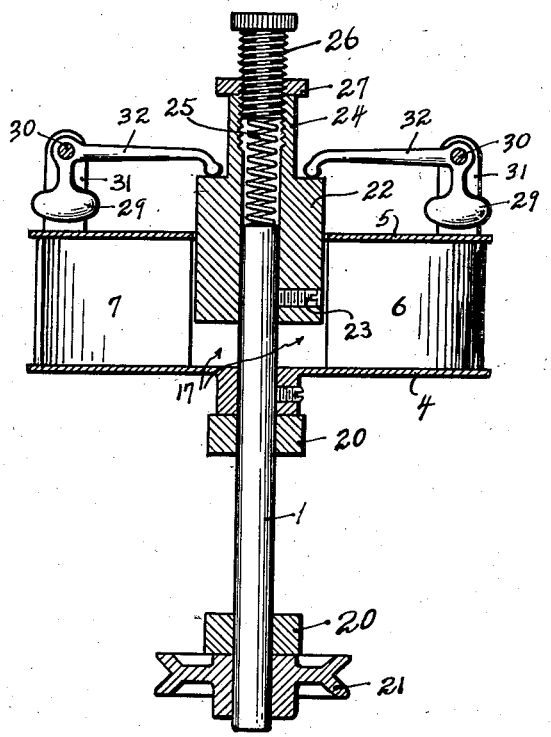
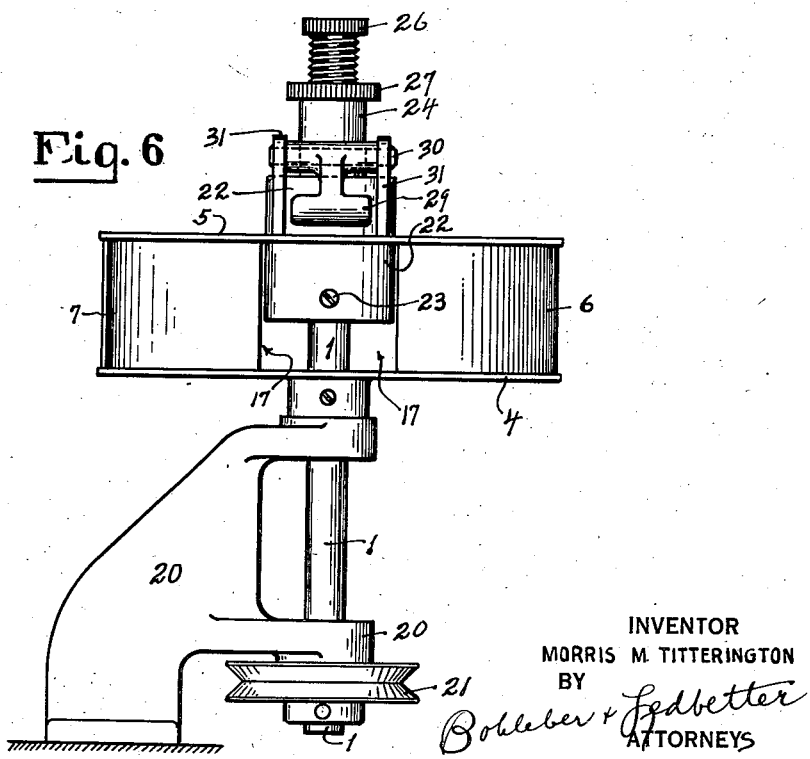
INVENTOR
MORRIS M. TITTERINGTON
BY
Bohleber + Ledbetter
ATTORNEYS Patented July 8, 1930

1,770,328

UNITED STATES PATENT OFFICE

MORRIS M. TITTERINGTON, OF BROOKLYN, NEW YORK; GEORGE A. TITTERINGTON, EXECUTOR OF SAID MORRIS M. TITTERINGTON, DECEASED, ASSIGNOR TO PIONEER INSTRUMENT COMPANY, INCORPORATED, OF BROOKLYN, NEW YORK, A CORPORATION OF NEW YORK

WINDMILL

Application filed December 24, 1926. Serial No. 156,844.

This invention relates to fluid working instruments such as propellers, fans, windmills and the like, and also relates to speed controlling means therefor to increase their efficiency. My invention is useful in a variety of ways and particularly on aircraft to drive auxiliary apparatus such as electric generators, pumps and the like.

It is an object of this invention to provide an improved windmill, or other fluid driving or driven device, which may be easily and quickly adjusted or regulated as to its speed of operation, and further, to provide a method and means of adjusting, regulating or controlling the speed and power output of such device, and in this respect my invention provides in one of its forms a speed regulating device which is automatic and in another form there is shown a manually adjustable speed regulator.

It is also an object to provide a windmill which may be adjusted to run at any desired speed when the load on it and the air speed driving it are constant, and further, to provide a method whereby the windmill may automatically regulate its operation so that it will tend to maintain a constant speed of rotation regardless of the air speed driving it and regardless of the power which it is called upon to furnish.

It is also an object to provide a device of the class described which shall include means to free a blade, moving in fluid, of eddy and suction currents which interpose a retarding force at the rear thereof, and by doing so an increased reaction is attained between the blade and fluid. As an example, a windmill constructed according to my invention delivers an increased torque on the drive shaft in a given airstream.

The features of novelty which I believe to be characteristic of my invention are pointed out in the appended claims. The invention, both as to its principles and embodiments will best be understood by reference to the specification and accompanying drawings, in which:

Figure 1 is a longitudinal section; and Figure 2 is an outer end elevation.

Figure 3 is a transverse section on lines 3—3 of Figure 1.

Figure 4 is a diagrammatic view illustrating the principles of my invention.

Figures 5 and 6 show respectively, a side elevation and longitudinal section of the fluid reaction device or windmill including a governor to automatically maintain constant the speed of the windmill.

In accordance with my invention, I provide fluid reaction blades or vanes forming pockets adapted to entrap fluid such as air impinging on the device on one side of the center of rotation. These blades are preferably symmetrically disposed about the axis of rotation and arranged in such a manner as to deflect or bypass the entrapped fluid toward and through a central fluid spillway, opening, or valve passage. In one example of the invention, side plates join the blades to make a rigid construction and also to prevent lateral escape of the entrapped and deflected fluid. The flow of fluid through the spillway may be regulated so as to increase or decrease the quantity thereof by which the speed of rotation of the device is correspondingly increased or decreased.

The vanes or blades of the device are so arranged that the open space or air spillway is left preferably surrounding the axis of rotation and the open space may assume the form of a cylinder, and the fluid entrapped on one side of the vanes is deflected toward the center of rotation and passes through this open space and freely makes its escape whereby it will be seen that under the action of a stream of fluid impinging thereon, a portion of the fluid is deflected from its path and bypassed centrally around and out through the vanes and in so passing transfers a portion of its kinetic energy to the device at the front of the blades and neutralizes retarding eddy and suction currents at the rear of the blades. Since the reaction of the impinging fluid is different on opposite sides of the center of rotation, as will be pointed out more in detail hereinafter, an unbalance of forces is set up tending to cause rotation of the device, and one of the features of my invention is to regulate or vary this unbalanced condition of forces whereby the speed of the machine is controlled.

For the purpose of regulating the speed of the windmill, a baffle element is provided which may be inserted to obstruct more or less or vary the size of the fluid spillway passage through the device, and it has been found that when such baffle or speed control member is adjusted to make smaller the size of the opening the windmill decreases its speed, and when adjusted to make the passage large its speed increases. Thus the speed is regulated by adjusting the position of the baffle in the passage as desired to vary the size of the opening centrally of the windmill blades, and this baffle adjustment is effected by a governor or by a manual adjustment according to that form of the invention desired for use.

The baffle element referred to may be adjusted manually so as to cause the windmill to run at any desired speed provided the wind driving the windmill and the power it is called upon to furnish bear certain relations to each other, or it may be caused automatically to take up different positions according to the speed of revolution of the windmill and thereby operate to maintain a nearly constant speed of revolution regardless of the wind speed or the load it is called upon to carry.

The Figure 4 diagram illustrates the principle of the invention wherein air vanes or windmill blades 14 and 15 are carried on a shaft 16 and head plate 4. If now it be assumed that a stream of air F impinges the vanes 14 and 15 as shown by the arrows, it will be seen that the air is entrapped in the vane 14 due to its forwardly directed outer end thereby forming a pressure area P in front of the blade 14 while the airstream F slips past the other blade 15 due to its rearwardly directed outer end thereby forming a negative pressure or rarefied area S, amounting in fact to suction, at the rear of the vane 15. In other words a windmill or an anemometer vane or any propeller blade at one position is under maximum pressure and another position is under minimum pressure; the maximum pressure resulting by reason of the vane being pointed into the airstream F and minimum pressure resulting by reason of the vane being pointed away from the airstream F. Thus the propeller wheel 14—15 rotates in a clockwise direction because of the greater pressure on the vane 14.

But in any propeller wheel there exists the negative pressure or actual suction area S behind that particular blade, as 15, which is turning directly into and against the airstream F. This suction area S builds up behind a blade 15 and attains its maximum retarding tendency once every complete revolution, and this condition obtains by reason of the airstream F and blade 15 moving at maximum speed in opposite direction which sets up eddy currents behind the blade 15 in the area S thereby creating a vacuum which substantially retards the movement of the blade 15. It is to increase or decrease this intensity of the vacuum or suction area S behind the blades resulting in ability to regulate the speed and power of the windmill, that my invention among other things has to do.

Referring further to the diagram for a practical illustration of the principles involved, the fluid working instrument is made with an air spillway 17 centrally of the vanes and at the shaft 16 and by virtue of this opening, fluid under pressure from the area P is permitted to deflect through the spillway 17 in the direction of the arrow D and its inrush into the area S instantly decreases the rarefaction in that area. In fact fluid is bypassed or deflected from the area P of high pressure into the area S of low pressure during the early stage of rarefaction at S or in its incipiency which prevents rarefaction and thus no retardation of rotation ensues by reason of the fact that a vacuum S is prevented from forming behind the blade at the instant the blade starts to traverse the opposing airstream F, and my invention therefore provides means for speeding up an air driven wheel or blades. In other words my invention provides means in a fluid working instrument for equalizing the pressure on the front and rear surface of a blade at its critical point of revolution where heretofore a direct suction was set up tending to run the blade in a direction reverse to that at which it was rotating.

What is of further importance, my invention includes means to vary the size of the airstream spillway 17 by which is controlled the volume of air bypassed from P to S along the path D. A baffle, sleeve, valve, or other means 11 is interposed between the ends of the blades 14 and 15 and is designed to increase the size of the opening 17 to maximum or close it entirely. The larger the opening 17, the more fluid that deflects into and neutralizes the suction area S and the higher the speed of the blades. The smaller the opening 17 the less fluid which may reach the area S and thus the greater the reaction and retardation against free rotation and the slower the bladed windmill wheel will run.

From the foregoing it will be seen how I regulate the speed of rotation of the device and consequently vary its speed in a fluid stream of constant velocity and secure a variable power output therefrom. Aside from the foregoing description, it is the unimpeded flow of fluid through the spillway 17 of the device and its escape through the center of the revolving blades which enable the device to attain greater efficiency such for example as an increase in velocity in a given fluid stream.

Referring now more particularly to the other views of the drawings, Figures 1 to 3 inclusive, 1 designates a shaft to support the device, and the shaft is carried in a suitable bearing 2 and hollow support tube 3. The windmill head comprises spaced disks 4 and 5 with impeller blades secured therebetween. The device is supported in service position by the tube 3 and the drive shaft is concealed therein.

A number of impeller vanes or air blades herein shown, say three in number, 6, 7 and 8 respectively, are secured at opposite sides between the spaced parallel head plates or disks 4 and 5. The inner ends of the windmill blades 6, 7 and 8 are spaced apart, preferably terminating a suitable distance from the shaft 1 or otherwise designed and constructed to afford a central spillway 17 of the character and for the purposes heretofore explained in connection with Figure 4. This construction, among other things, distinguishes my invention. The outer tips of the blades in some cases are curved which emphasizes the fluid pocket formation and the outer tip curvature not only aids in entrapping fluid to turn the device but tends to rapidly bypass the fluid through the central opening 17.

The inside plate 4 is provided with an opening which receives a pulley 10 and hub 9ª adapted to abut against a shoulder on shaft 1 and a nut 9 anchors the windmill head on the shaft 1. The pulley hub 9ª—10 is riveted to or otherwise made a part of the head. A belt may be driven from the pulley 10 to run a generator or the like, or a load can be driven directly by shaft 1 as requirements demand.

For the purpose of regulating the speed of the anemometer head 4—5, a baffle or valve element 11, in sleeve form for lightness, is screw-threaded into a bushing 12 secured to the outer plate or disk 5 and defining a threaded aperture in outer plate 5. This speed control device 11 is shown, for convenience and lightness in weight, in sleeve form screw threaded for manual regulation of the size of the spillway or valve opening 17. Its function is to increase or decrease the size of the air-spillway 17 left between the ends of the blades or vanes 6, 7 and 8. As noted, the inner ends of the anemometer blades are not brought together but are spaced apart at the shaft 1 to form the air-spillway 17, the size of which is variable by reason of the sleeve 11 which screws down into or back out from the air-spillway opening to decrease or increase the size thereof and regulate the volume of air which flows therethrough to the rear of the blades, the result of which is to decrease or increase the speed of the windmill head.

The blades are preferably curved and arranged at an angle with the radii and symmetrically disposed so as to deflect air impinging upon the concave side thereof towards the center of rotation. The blades terminate at a distance from the center so that the inner edges of the vanes form the elements of a cylinder 11 concentric with the axis of rotation of the device and also define the air spillway 17 within which the movable baffle element or sleeve 11 is mounted for axial adjustment. Clearance is afforded between the part 11 and blade ends so that the adjustable baffle 11 may be moved without difficulty in and out of the opening 17. In Figure 1 the speed adjusting sleeve 11 is shown screwed part way into the wind driven wheel and is shown screwed out in dotted lines.

Referring now to Figures 5 and 6, a description of a speed governor to regulate the position of the baffle valve will be given. The windmill shaft 1 is mounted for rotation in a bearing support bracket 20, a grooved pulley 21 being fastened to shaft 1 to permit power to be transmitted by a belt to any machine which is desired to operate by the power of the windmill. The windmill wheel consists of the spaced head discs 4 and 5 with blades 6 and 7 or additional blades if desired grouped in suitable arrangement as shown in Figure 3 with air spillway 17 thereinbetween. A baffle element 22 is made to slide freely on shaft 1 in spillway opening 17 where it may be fixed in any position by set screw 23 should it be desired, at any time, to temporarily put the automatic governor feature out of commission so as to attain maximum unregulated speed of rotation of the wheel.

The baffle sleeve or valve 22 is preferably made with a neck 24 defining a passage therethrough and by which it is slidably carried on the shaft 1 to move in and out of the opening 17 through the center of the wheel. A spring 25 is confined in the neck 24 between the end of shaft 1, and an adjusting screw 26 is threaded into the neck and fixed by a lock nut 27. Thus the spring 25 yieldingly supports the baffle 22 on the shaft 1 in the opening 17 in a manner suitable for its control by a governor.

A centrifugal governor, say of the fly-ball type, regulates the depth of the baffle sleeve in the blade opening 17. The governor comprises one or more fly weights 29, each of which is carried pivotally on a pin 30 mounted in a post or posts 31 carried with the windmill wheel 4—5 and including a reach arm 32 which is integral with the weight 29. The outer free end of the reach or lever arm 32 rests on the baffle sleeve 22 tending to urge it inwardly of the opening 17 against the resilient coil spring 25 or permitting outwardly sliding movement of the baffle on the shaft depending on the degree of centrifugal force exerted by the weights 29.

It will be seen when the windmill is rotating that centrifugal force acting on weight 29 will apply a force to sleeve 22 in a direction tending to force it further into the spillway 17 between the blades, and at the same time compressing spring 25. An increase in the speed of rotation of the wheel caused by an increase in the speed of the wind thereagainst or caused by a decrease in the power required from the windmill, causes the fly balls or weights 29 to force the baffle sleeve 22 further into the opening 17 between the blades which has the effect of decreasing the speed of rotation of the windmill so as to prevent it from increasing its speed to any appreciable extent under these conditions.

Conversely if the velocity of the wind falls or the load increases, the centrifugal force on the fly weights 29 will decrease due to the lower speed of rotation of the windmill and permit the spring 25 to force the sleeve 22 further out of the valve opening 17 between the blades so as to permit a freer passage of air between them which causes an increase in the torque of the windmill with the result that its speed of rotation will not decrease appreciably under these conditions.

By varying the strength of the spring 25 with the adjustment screw 26 more or less force may be applied tending to move the sleeve 22 out of the opening 17 between the blades. The position of the sleeve 22 will, therefore, be varied by this adjustment with consequent varying of the size of opening 17. As the position of the valve sleeve 22 determines the speed of rotation of the windmill, it will be seen that by stiffening the spring by running the screw 26 inwardly, the windmill speed will be increased because the greater resistance of the spring must be overcome by the centrifugal force of the weights and as the force required to do so is greater, the speed of revolution of the windmill must be greater. Conversely, if the spring 25 is weakened by screwing out on the adjusting screw 26 the speed of rotation of the windmill will decrease because less centrifugal force is required to move the baffle 22 inwardly thereby more quickly reducing the size of opening 17.

The automatic means described for maintaining a constant speed of rotation of the windmill is generally preferable to a manual method of varying the opening between the blades but in some cases it is desirable to manually fix the size of the opening. For this purpose the set screw 23 is provided for fastening the sleeve 22 to any desired position on the shaft. By providing, in one windmill, means for definitely fixing the size of the opening 17 between the blades, as well as providing means for automatically varying the size of the opening according to the speed of rotation of the windmill, a wind power machine of varied utility is produced.

While I have shown and described certain preferred embodiments or examples of my invention, it is to be understood that changes may be made without departing from the principles of my invention. Although I have described my improved fluid working instrument as a windmill to generate power from a passing air or fluid stream, I may prefer to adapt the principle of my invention to other obvious uses such as propellers and the like by which fluid streams may be produced or propelling reaction obtained therefrom.

What I claim is:

1. A windmill comprising a plurality of fixed vanes exposed to the exterior and disposed about a center of rotation and so arranged as to deflect toward said center fluid impinging on said vanes on one side of said center of rotation and said vanes being so constructed and arranged as to form an outlet for such deflected fluid, and means for varying the size of said outlet.

2. A windmill comprising a pair of parallel spaced plates mounted for rotation about a common axis, a plurality of fixed vanes symmetrically disposed between said plates about said axis in a manner to form fluid pockets, said vanes being so arranged that the outer periphery is exposed to fluid currents and so as to form a fluid outlet space from said pockets at the axis of rotation, and means for varying the size of said outlet space.

3. A windmill comprising a pair of parallel plates mounted in spaced relation for rotation about a common center, a plurality of curved vanes having exposed exterior edges and symmetrically disposed about said center between said plates to deflect toward said center fluid impinging on said exposed exterior edges of the vanes on one side of said center, said vanes being so disposed as to leave a fluid outlet space at said center for the passage of fluid to the back of the vanes, and a baffle element mounted for axial movement with respect to said outlet space to impede the flow of fluid around the inner ends of said vanes.

4. A windmill comprising, radially arranged blades having exposed edges including a fluid passage at their center between the adjacent ends thereof to afford an outlet to the back of the vanes, a sleeve movably carried in the passage and adapted to regulate the size of said passage, and a shaft supporting the blades and sleeve.

5. A windmill comprising, a pair of spaced head plates, impeller blades secured therebetween with a fluid spillway included between the adjacent blade ends to afford a fluid outlet to the back of the vanes, a baffle sleeve carried by one of the head plates and adjustable in and out of the spillway to vary its size, and a shaft and bearing means secured to the other head plate.

6. A windmill comprising a plurality of impeller vanes forming fluid pockets each vane having an exposed edge, and having their inner ends spaced from each other to afford outlet space for entrapped fluid, and a sleeve including means to retain it in adjusted position within the outlet space to vary the volume of fluid flowing therethrough.

7. A windmill comprising a plurality of impeller vanes forming fluid pockets, and having their inner ends spaced from each other to afford outlet space for entrapped fluid to the back of the vanes, valve means mounted in the outlet space, and a centrifugal governor to operate the valve means.

8. A windmill comprising a plurality of impeller vanes forming fluid pockets, and having their inner ends spaced from each other to afford outlet space for entrapped fluid to the back of the vanes, a baffle sleeve mounted movably in the outlet space, and a centrifugal governor connected with the baffle sleeve.

9. A windmill comprising a plurality of vanes disposed about a center of rotation in a manner to and including means forming fluid pockets, said vanes being so arranged as to form a fluid outlet space from said pockets at said center, and means for varying the size of said outlet space, and a centrifugal governor connected with the latter means.

10. A windmill comprising a pair of parallel plates mounted in spaced relation for rotation about a common center, a plurality of curved vanes symmetrically disposed about said center between said plates to deflect toward said center fluid impinging on said vanes on one side of said center, said vanes being so disposed as to leave a fluid outlet space at said center, and a baffle element mounted for axial movement with respect to said outlet space to impede the flow of fluid around the inner ends of said vanes, and a centrifugal governor connected with the baffle element.

11. A windmill comprising, fluid reaction blades curved at their outer tips forming fluid pockets and spaced apart at their inner ends providing a fluid spillway, a valve-like device and means movably mounting it in the spillway to open and close the same, weight means pivoted on the windmill and swinging outwardly with increased speed of rotation, and a connection from the weight means to the valve-like device to impart closing movement to said valve device as the windmill increases its speed of rotation.

12. A windmill as defined in claim 11 wherein spring means resiliently supports the valve device, and adjusting means to regulate the tension of the spring.

13. A windmill comprising a disk having an axial aperture, blades carried on the disk and their ends terminating proximate the aperture forming a fluid escape between the blade ends, a baffle valve disposed movably between the inner ends of the blades in the fluid escape, spring means tending to urge the baffle valve outwardly of the fluid escape, and a centrifugally operated mass cooperating with the baffle valve urging it inwardly on increased speed of rotation of the windmill.

14. A windmill comprising a shaft, fluid reaction blades and means carrying them with the shaft and providing a central fluid escape about the shaft, a valve member slidably carried on the shaft to vary the size of the fluid escape, and means to regulate the position of the valve member on the shaft.

15. A windmill comprising a shaft, fluid reaction blades and means carrying them with the shaft and providing a central fluid escape about the shaft, a valve member slidably carried on the shaft to vary the size of the fluid escape, and a centrifugal governor operating the valve to increase the size of the fluid escape when the speed of windmill rotation decreases and to decrease its size upon increased rotation.

16. A windmill comprising a disk, fluid reaction blades carried therewith, and provided with a fluid escape proximate their axis, a valve mounted in the fluid escape, a governor weight pivoted on the disk including a connection with the valve to automatically vary the size of the fluid escape, and means to fix the valve against movement by the governor.

17. A windmill comprising, a shaft, fluid reaction blades and means fixing them for rotation with the shaft, and providing a fluid escape opening through the blades about the shaft, said shaft extending into the opening, a valve sleeve slidably mounted on the shaft within the opening, governing means automatically moving the valve on the shaft to vary the size of the opening according to the speed of the windmill, and means to fix the valve in stationary position on the shaft to prevent movement thereof.

In testimony whereof I affix my signature.

MORRIS M. TITTERINGTON.